UNITED STATES PATENT OFFICE.

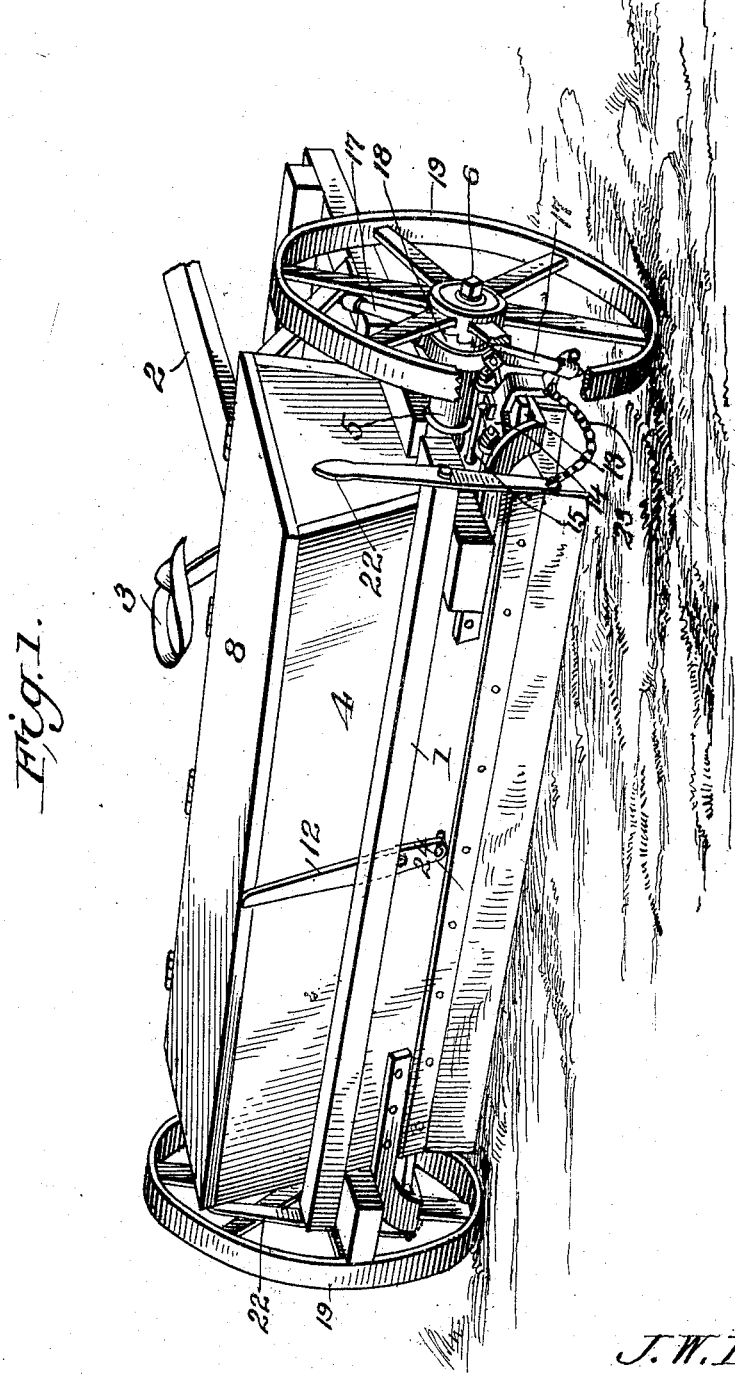

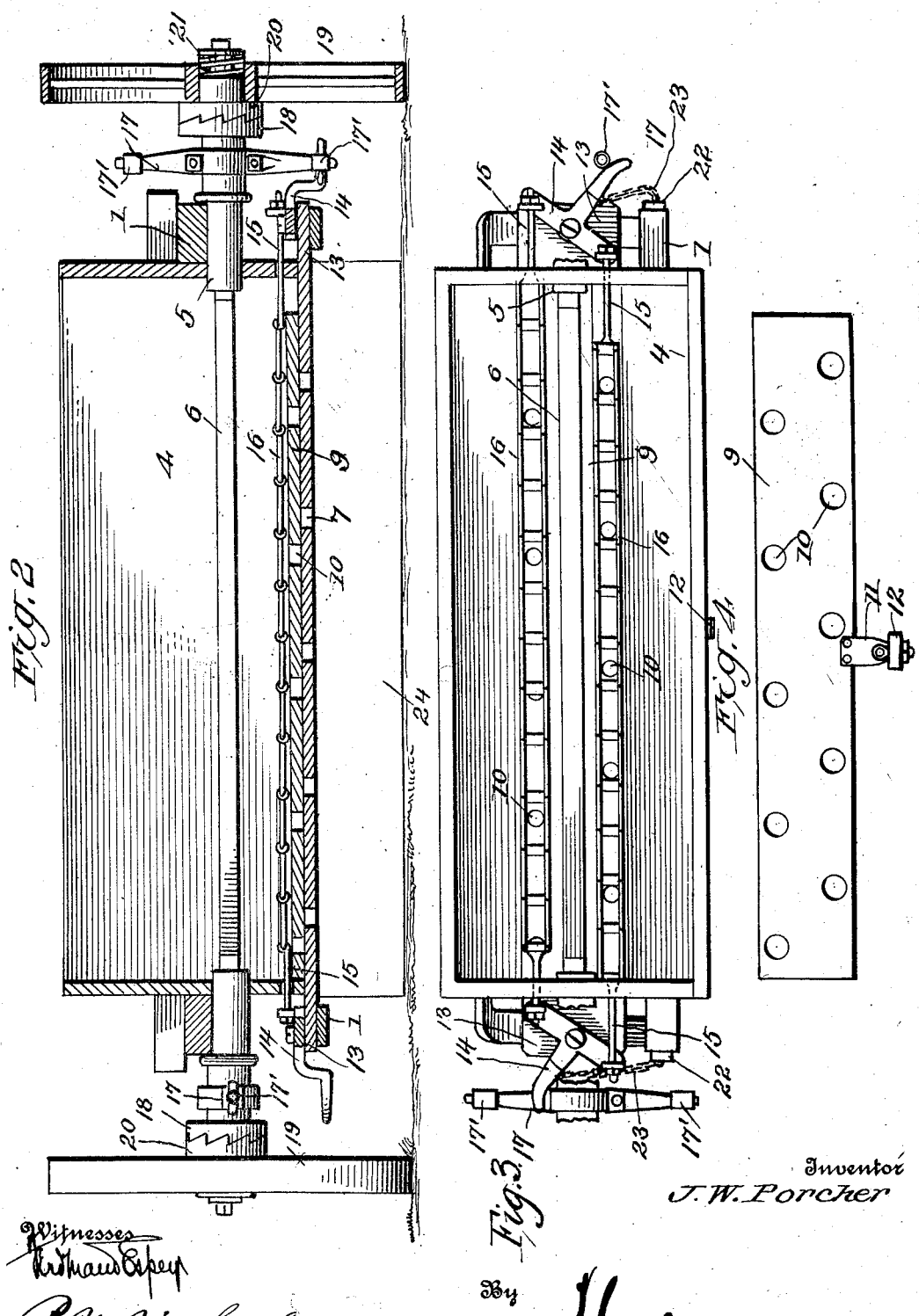

JACOB W. PORCHER, OF PORT WASHINGTON, OHIO.

LIME-SPREADER.

1,059,206.

Specification of Letters Patent.   Patented Apr. 15, 1913.

Application filed June 14, 1912. Serial No. 703,741.

*To all whom it may concern:*

Be it known that I, JACOB W. PORCHER, a citizen of the United States, residing at Port Washington, in the county of Tuscarawas and State of Ohio, have invented certain new and useful Improvements in Lime-Spreaders, of which the following is a specification.

This invention relates to lime spreaders, and has for its object to provide a simple and durable structure adapted to be moved over the ground and provided with means for automatically and evenly distributing lime during its travel.

With this object in view the structure includes a hopper mounted upon a frame which in turn is supported upon a wheel mounted axle which traverses the length of the hopper. The hopper is provided in its bottom with openings, and a slide is mounted upon the bottom of the hopper and provided with openings which are adapted to be brought into register with the openings in the bottom of the hopper. Agitators or feeders are arranged to reciprocate above the openings in the hopper bottom and slide, and means is provided for reciprocating the same from the axle as the axle rotates.

For a full understanding of the invention, reference is to be had to the following description and accompanying drawings in which:

Figure 1 is a perspective view of the spreader; Fig. 2 is a sectional view of the same taken through the hopper from end to end thereof; Fig. 3 is a top plan view of the same; Fig. 4 is a plan view of the slide.

Corresponding and like parts are referred to in the following description and indicated in all the views of the accompanying drawings by the same reference characters.

The spreader includes a frame 1 to which is attached a draft tongue 2 and upon which is secured the driver's seat 3. A hopper 4 is supported by the rear portion of the frame and bearings 5 extend through the ends of the hopper, an axle 6 being journaled in the said bearings. The said axle traverses the length of the hopper, and its intermediate portion is angular in cross section and spaced above the bottom of the hopper while its end portions are circular to rotate in the bearings and project beyond the sides of the frame 1. The bottom of the hopper is provided with several rows of openings 7, the openings in one row being in staggered relation to the openings in the adjacent row— that is to say, the openings in one row occur opposite the intervals between the openings in the adjacent row. The hopper is also provided with a hinged top 8.

A slide 9 is arranged upon the bottom of the hopper between the front and rear walls thereof and is provided with openings 10 which are adapted to be brought into register with the openings 7 in the bottom of the hopper. The slide is provided at its edge with a lug 11 which extends through the rear wall of the hopper and a lever 12, fulcrumed upon the back of the hopper, engages the lug 11. Therefore, it will be seen that by swinging the lever 12 the slide 9 may be moved toward an end of the hopper whereby its openings 10 may be moved into or out of register with the openings 7 in the bottom of the hopper. The bottom of the hopper is extended beyond the ends thereof as at 13, and T-shaped levers 14 are fulcrumed upon the extensions, eye bolts 15 being pivotally connected at their outer ends with the branches of the said levers. These bolts extend through the ends of the hopper and chain sections 16 are connected at their ends with the bolts, the said chain sections being disposed over the openings 10 in the slide 9. The stems of the levers 14 project beyond the ends of the extensions 13 of the bottom of the hopper into the paths of radially disposed arms 17 which are carried by the axle 6, and are equipped with rollers or rotary sleeves 17' at or near their extremities, as shown. The arms 17 at one end portion of the axle are disposed approximately at right angles to the arms 17 at the other end portion of the axle. Clutch members 18 are fixed to the axle 6 and supporting wheels 19 are journaled upon the end portions of the axle, the wheels being provided with clutch hubs 20 which are adapted to engage the said clutch members 18. Springs 21 are mounted upon the end portions of the axle and bear against the outer ends of the hubs 20 and serve as means for normally holding the clutch hubs 20 in engagement with the clutch members 18. The parts 20 and 21 are so arranged that when the wheels 19 turn as the spreader is moved in a forward direction the clutch hubs 20 engage the clutch members 18 and cause the axle to rotate, but should the wheels 19 turn in an opposite direction the axle 6 will remain at rest. This is what is generally known as an escapement device and is frequently used in agricultural machines to permit the machines to be readily turned at the ends of rows or at sides of a field.

22 designates a timing or adjusting lever which is fulcrumed on the end of the frame, or other convenient point, and is connected by a chain or other flexible device 23 with the adjacent lever 14 so that the parts may be adjusted to bring the dropping operation into coincidence with the arrival of the dropper in a position over the hills.

An apron 24 is secured to the hopper at the front and the rear of the same and depends therefrom to the ground to prevent the wind reaching the dropping lime and blowing the same away from the spots it is intended to reach.

The operation of the spreader is as follows: When it is moved over the field the slide 9 is moved so that its openings 10 are brought into register with the openings 7 in the bottom of the hopper 4. Previous to this the said hopper has been supplied with a quantity of lime. During the forward movement of the machine the axle 6 is rotated as above described, and inasmuch as the axle traverses the length of the hopper it will have a tendency to keep the lime from packing or banking in the hopper. As the axle 6 rotates the arms 17 come in contact with the end portions of the branches of the levers 14 and swing the said levers so that the agitator and feeder chains 16 are moved longitudinally over the rows of openings 10 in the slide 9. This movement on the part of the said chains will break up the lime and cause the same to flow freely through the openings 7 and 10 and gravitate to the ground. By reason of the fact that the arms 17 at one end of the axle are at a right angle to the arms 17 at the other end, the levers 14 are operated alternately, and consequently the chain sections 16 are caused to reciprocate along the slide 9. When the lever 14 at one end of the hopper is swung to an abnormal position the lever 14 at the other end is moved by the movement of the chains to a normal position, and vice versa.

The machine is composed of few parts which are simple in their construction and arrangement and will operate efficiently without liability to get out of order. Every time an arm 17 strikes the end of a lever 14. the lever will be swung rearwardly so that a quantity of lime will be pushed into the openings 10 and will drop through the same to the ground. At the end of the field, the timing lever 22 may be actuated to pull rearwardly the lever 14 which is then in the forward position so that the lever will miss stroke on the next turn of the arm 17. The feeding of the lime will thus be suspended while the machine is being brought into position for the return trip across the field. The rollers 17' minimize the wear between the arms 17 and the levers 14.

Having thus described my invention, what is claimed as new is:

1. A spreader comprising ground wheels, a hopper supported thereby and having openings in its bottom, T-shaped levers fulcrumed at the ends of the hopper and having their stems extending outwardly therefrom, agitators extending through the openings in the bottom of hopper over the openings in the bottom of the same and connecting the corresponding arms of the T-shaped levers at the opposite ends of the hopper, and means connected with the ground wheels to engage the stems of the levers and swing said levers alternately.

2. A spreader comprising a hopper, an axle traversing the length thereof and spaced from the bottom thereof, said hopper being provided in its bottom with openings, wheels supporting the axle, radial arms carried by the axle, levers fulcrumed at the ends of the hopper below the axle and having ends which lie in the paths of movement of the arms, and chains secured to and extending between the levers and lying over the openings in the bottom of the hopper.

3. A spreader comprising a hopper having openings in its bottom, an angular axle traversing the length of the hopper and spaced from the bottom thereof, wheels supporting the axle, radial arms carried by the axle, adjacent the ends of the hopper, T-shaped levers fulcrumed at the ends of the hopper and having end portions which lie in the paths of movement of the arms, and flexible members secured to the levers and extending between the same and over the openings in the bottom of the hopper.

4. A spreader comprising a hopper, an axle traversing the length thereof and spaced from the bottom thereof, said hopper having openings in its bottom, wheels supporting the axle, radial arms carried by the axle beyond and adjacent the ends of the hopper, the arms at one end being disposed at an angle with relation to the arms at the other end, T-shaped levers fulcrumed at the ends of the hopper and having end portions which lie in the path of movement of the arms, and flexible members secured to the arms of the T-shaped levers and extending through the hopper and over the openings in the bottom of the same.

In testimony whereof I affix my signature in presence of two witnesses.

JACOB W. PORCHER. [L. S.]

Witnesses:
GEORGE V. LAMNECK,
O. M. SCHWAB.